(12) United States Patent
Park (10) Patent No.: US 10,527,224 B1
(45) Date of Patent: Jan. 7, 2020

(54) MINIATURE, CONCEALABLE, TAMPER-RESISTANT BRACKET FOR DISPENSERS AND OTHER WALL-MOUNTED ARTICLES

(71) Applicant: Sysco Guest Supply, LLC, Somerset, NJ (US)

(72) Inventor: Joungsu Park, South Brunswick, NJ (US)

(73) Assignee: Sysco Guest Supply, LLC, Somerset, NJ (US)

( * ) Notice: Subject to any disclaimer, the term of this patent is extended or adjusted under 35 U.S.C. 154(b) by 0 days.

(21) Appl. No.: 16/543,815

(22) Filed: Aug. 19, 2019

Related U.S. Application Data

(60) Provisional application No. 62/750,621, filed on Oct. 25, 2018.

(51) Int. Cl.
*F16M 13/02* (2006.01)
*A47K 5/12* (2006.01)

(52) U.S. Cl.
CPC ............ *F16M 13/02* (2013.01); *A47K 5/12* (2013.01); *A47K 2201/02* (2013.01)

(58) Field of Classification Search
CPC .................................. F16M 13/02; A47K 5/12
USPC ............ 248/231.91, 225.11, 223.41, 224.51; 220/480, 481
See application file for complete search history.

(56) References Cited

U.S. PATENT DOCUMENTS

| | | | | |
|---|---|---|---|---|
| 3,580,077 A | * | 5/1971 | Blackman | G01K 1/083 600/549 |
| 4,460,141 A | * | 7/1984 | Svensson | F16B 2/16 248/222.13 |
| 5,435,511 A | * | 7/1995 | Hsu | A01K 63/006 248/206.3 |
| 5,518,051 A | * | 5/1996 | Wells | A47K 5/00 141/114 |
| 5,947,322 A | * | 9/1999 | Ho | B65F 1/141 220/477 |
| 6,227,400 B1 | * | 5/2001 | Paladino | A24F 19/0092 220/478 |
| 6,318,600 B1 | * | 11/2001 | Winnett | B65D 83/386 222/173 |
| 6,318,687 B2 | * | 11/2001 | Trana | B60R 11/0241 248/220.21 |

(Continued)

*Primary Examiner* — Jeremy Carroll
(74) *Attorney, Agent, or Firm* — John G. Posa; Belzer PC (57) ABSTRACT

A dispenser system includes an inconspicuous, tamper-resistant bracket used to mount containers, bottles, vessels, dispensers or other articles to a wall surface. A coupling structure engages with and supports the article for use. The coupling structure may comprise a male-female coupling structure including, for example, a vertical rail on one of the bracket or container, and a corresponding vertical slot on the other of the bracket or container. An upper panel, door or lid opens with a tool or key, providing access to the bracket coupling structure. A spring biases the panel, door or lid into an open condition, and a latch mechanism maintains the panel, door or lid in a closed and locked condition until opened. The system may further including a proprietary container with dimensions to visually obscure the bracket. The container may include a dispensing pump, and may be filled or refilled with a personal hygiene product.

26 Claims, 6 Drawing Sheets

(56) References Cited

U.S. PATENT DOCUMENTS

2011/0147553 A1\* 6/2011 Ostermeier ............. F16B 5/125
248/223.41

\* cited by examiner

MINIATURE, CONCEALABLE, TAMPER-RESISTANT BRACKET FOR DISPENSERS AND OTHER WALL-MOUNTED ARTICLES

REFERENCE TO RELATED APPLICATIONS

This applicant claims priority to, and the benefit of, U.S. Provisional Patent Application Ser. No. 62/750,621, filed Oct. 25, 2018, the entire content of which is incorporated herein by reference.

FIELD OF THE INVENTION

This invention relates generally to wall-mounted articles and, more particularly, to an inconspicuous, tamper-resistant bracket used to mount dispensers or other items to a wall surface.

BACKGROUND OF THE INVENTION

The hospitality industry is a broad category within the service industry that includes hotels and lodging, food and drink service, event planning, theme parks, transportation, cruise lines, travel, and tourism in general. In bath and restroom areas in particular, it is now common to have refillable containers with shampoo, conditioners and various other lotions for consumer use. Such dispensers may be wall-mounted and temporarily removable for refilling purposes. It is a challenge to design and install wall-mounted, refillable dispensers that adequately meet the simultaneous desirable characteristics of being attractive, unobtrusive, easily maintained and tamper-resistant.

SUMMARY OF THE INVENTION

This invention is directed to dispenser system that includes an inconspicuous, tamper-resistant bracket used to mount containers, bottles, vessels, dispensers or other items to a wall surface. The system may further include a proprietary tool to release the bracket for container mounting, as well as proprietary containers with physical features configured to engage with the bracket. "Container" in the context of the invention includes bottles and dispensers that may be removed and replaced or re-filled with a liquid, cream or gel for personal hygiene use including, without limitation, a shampoo, conditioner, shower wash, body lotion, soap, or the like. The system is therefore well suited to the hospitality industry.

The bracket has front and back surfaces, opposing side surfaces defining a width, and upper and lower portions, with the back surface of the bracket being adapted for mounting against an existing wall surface through any appropriate fastening device. The bracket further includes a coupling structure configured to engage with a container to support the container in a position spaced apart from the wall surface. The coupling structure may comprise a male-female coupling structure that may, for example, include a protrusion on one of the bracket or container, and a corresponding recess, cavity, groove or slot on the other of the bracket or container to receive the protrusion.

In preferred embodiments, the coupling structure is a vertically oriented slot on the bracket configured to receive a container with a protruding rail that engages with the vertically oriented slot. The vertically oriented slot may be on the front surface of the bracket, and the vertically oriented slot and protruding rail may form a dovetail or T-shaped joint in cross section to prevent the container from being pulled away from the bracket when the rail is received in the slot.

The bracket may further include an upper panel that opens to provide access to the vertically oriented slot, and closes when the protruding rail of the container is received in the slot. In the preferred embodiments, the upper panel comprises a hinged lid or door with a spring that biases the door into an open condition, and a latch mechanism that maintains the door in a closed and locked condition until opened.

The bracket may further includes an externally accessible structure in communication with the latch, with the system further including a tool configured engage with the structure and release the container. For example, the externally accessible structure may be an opening on one of the side surfaces of the bracket, and wherein a portion of a tool or key is configured for insertion into the opening to disengage the latch and unlock the door.

The system may further including a proprietary container having front and back surfaces, opposing side surfaces defining a width, and upper and lower portions defining a height, and a male-female coupling structure for mounting the container on the bracket. In preferred embodiments, the width and/or height of the container may be greater the respective width and height of the bracket so as to visually obscure the bracket when the container is mounted thereon. That is, the container may have upper and lower ends defining a height, the vertical rail or other protrusion on the container may also have upper and lower ends defining a height, with the height of the vertical rail or other protrusion on the container being less than the height of the container itself, such that one or both of the upper and lower ends of the vertical rail or other protrusion do not extend to the respective upper and lower ends of the container.

In all embodiments, the container may be a dispensing container with an upper portion that includes a manually operated pump. The container may be adapted to be filled or refilled with a liquid, cream or gel such as a soap, shampoo, conditioner or other personal hygiene product.

DETAILED DESCRIPTION OF THE INVENTION

This invention broadly resides in a locking bracket that couples an article to a wall surface. In the preferred embodiment, the article is a self-service, pump-activated lotion dispenser; however, the invention is not limited in this regard, as various articles such as alternative containers, dispensers, trays, and the like may alternatively be accommodated. As such, as used herein, "container" should be taken to include other wall-mounted articles such and bottles and dispensers. The container may be re-fillable with a liquid, cream or gel for personal hygiene use including, without limitation, a shampoo, conditioner, shower wash, body lotion, soap, or the like. The bracket and article are accordingly well suited to the hospitality industry.

Figure 1:
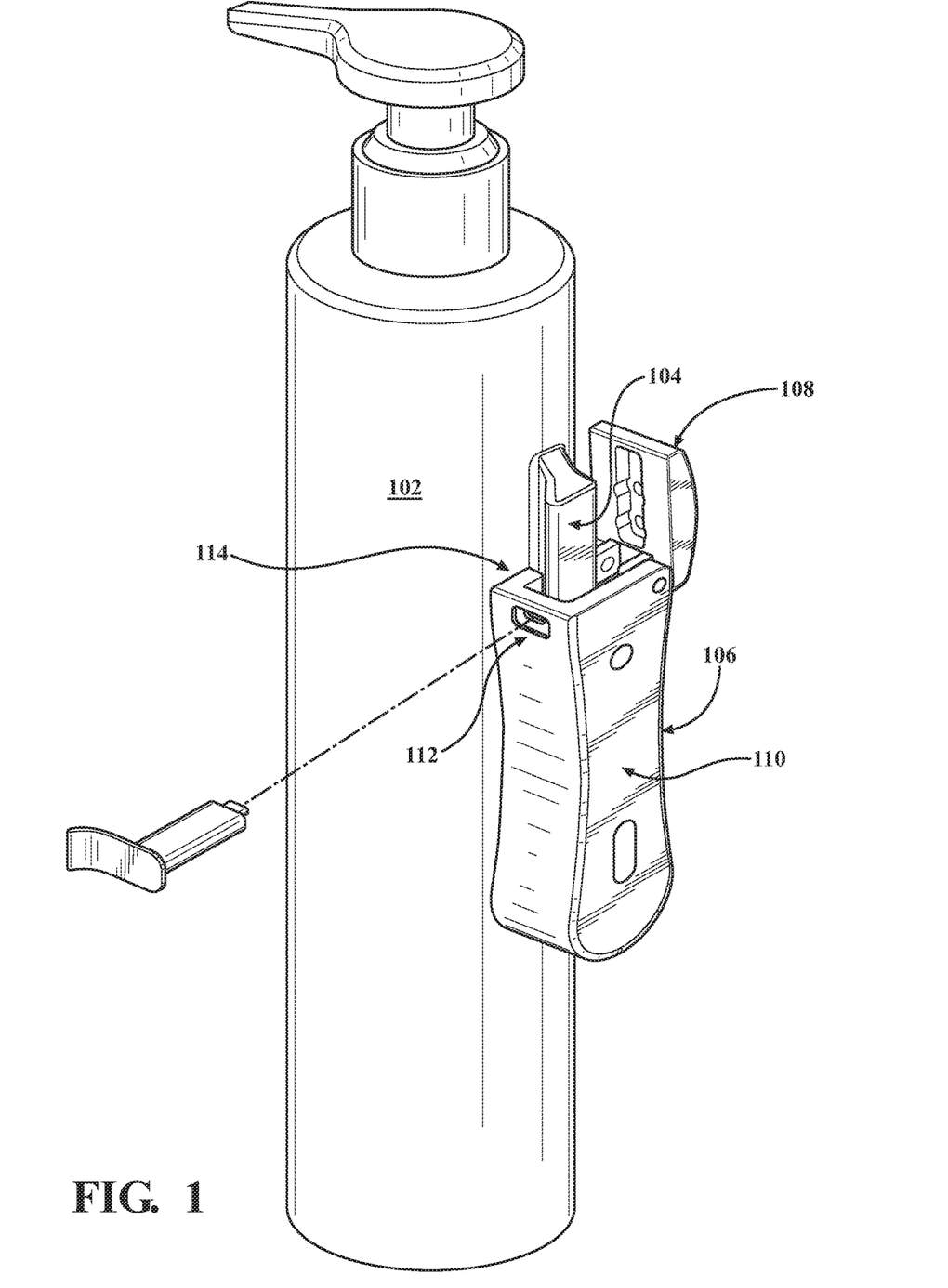
FIG. 1 is a drawing that shows a container being coupled to a wall-mounted bracket and a tool used to open a door on the bracket to remove and insert the container.

FIG. 1 is a drawing that shows a container 102 being coupled to a wall-mounted bracket 106, and a tool used to open a door 108 on the bracket to remove and re-insert the container 102. The back surface 110 of the bracket is mountable to a wall surface through any appropriate fastener(s), double-sided tape, silicone adhesive, and so forth. The container 102 is a cylindrical dispenser including an upper, manually operable pump mechanism, with the understanding that this particular container is exemplary only.

In the preferred embodiment, the container 102 includes a vertically oriented, protruding rail 102 that engages with a vertically oriented slot 114 in the bracket. It will be appreciated that other coupling arrangements may be used, including physically different protrusions and recesses, and that the protrusion may be on the bracket, and may be configured to engage with a corresponding recess, cavity, groove or slot on the container.

In the preferred embodiments, a panel covers the slot in the bracket to minimize tampering and unauthorized removal of the container. As perhaps best seen in FIG. 2, the panel comprises a spring-biased, latched lid or door 108. When a proprietary tool is inserted into opening 112 formed in a side of the bracket, a hook 111 on spring-loaded latch 113 is pushed inwardly, causing the door 108 to flip open through action of spring 109, thereby providing access to slot 114.

Figure 2:
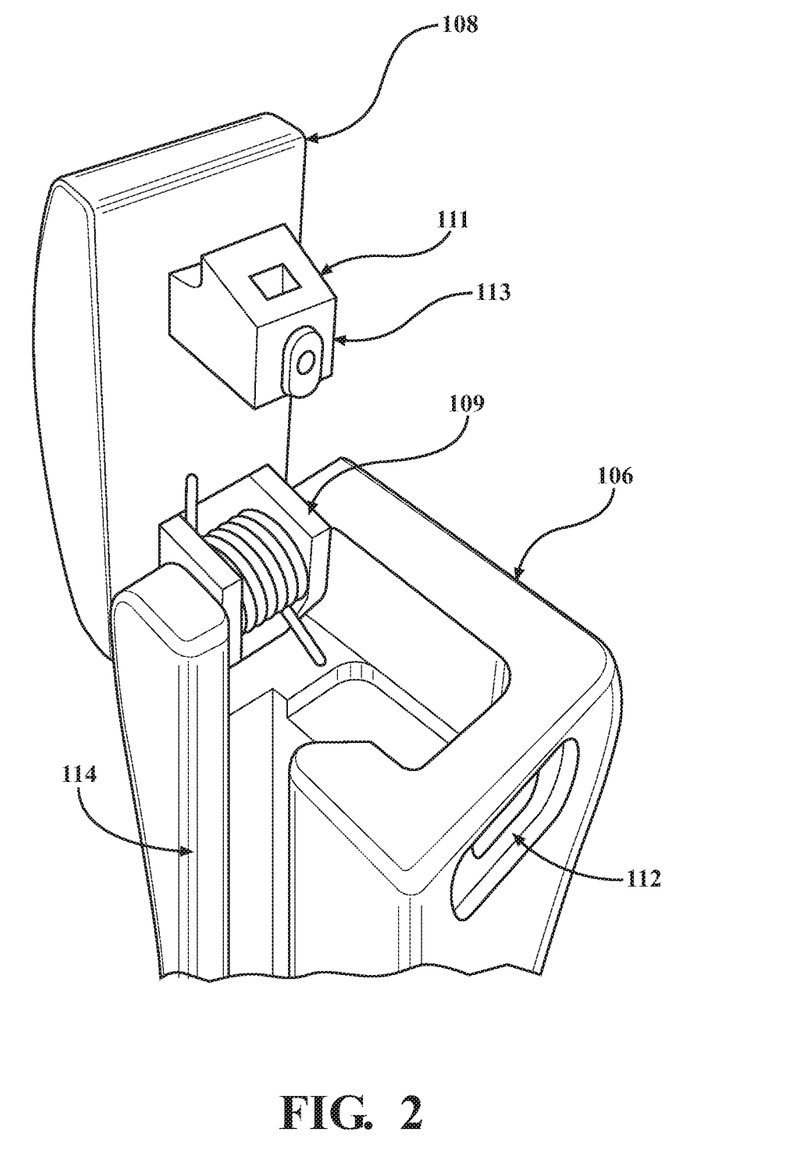
FIG. 2 is a detail perspective drawing that shows an upper portion of a preferred bracket including a door, spring, latch and other features.

In the preferred embodiment, the slot and rail form a dovetail configuration in cross section to prevent unauthorized removal of the container from the wall bracket when the container is mounted. However, any other geometry that resists separation may alternatively be used, including "T" and round/oval sliding systems. Note that, in the preferred embodiment, the vertical slot does not extend all the way to the bottom of the bracket, such that when the rail of the article is received by the slot and the lid is closed, the article is maintained in a stable, tamper-resistant position without falling out. One or more inner walls of the slot may include a wavy spring, for example to further enhance stability.

To close the door on the bracket, a user presses down on the door against the force of spring 109, and the hook 111 on the latch 113 re-engages with an edge within the bracket, maintaining the door in the closed position until the proprietary tool is used to reopen the door. The spring-biased latch mechanism and spring 109 are all preferably enclosed entirely within the bracket when the door is closed.

Figure 3A:
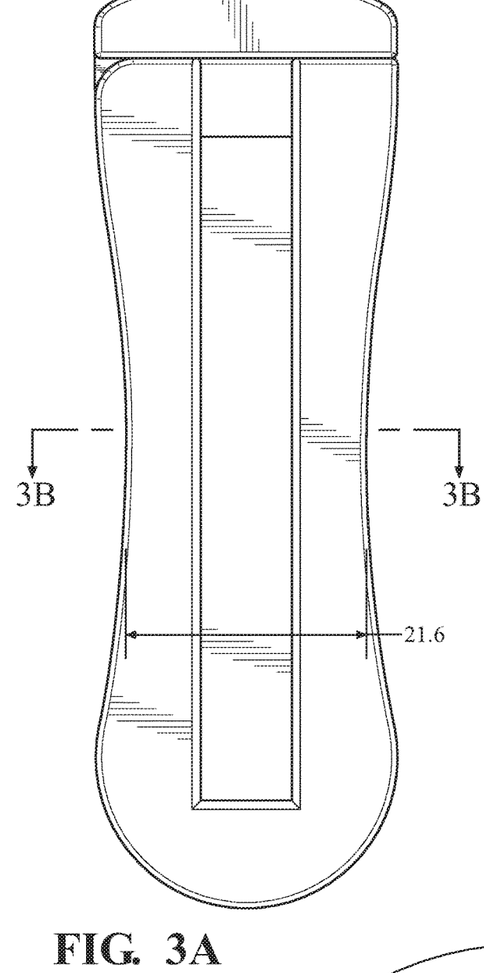
FIG. 3A is a front view of a bracket.
Figure 3B:
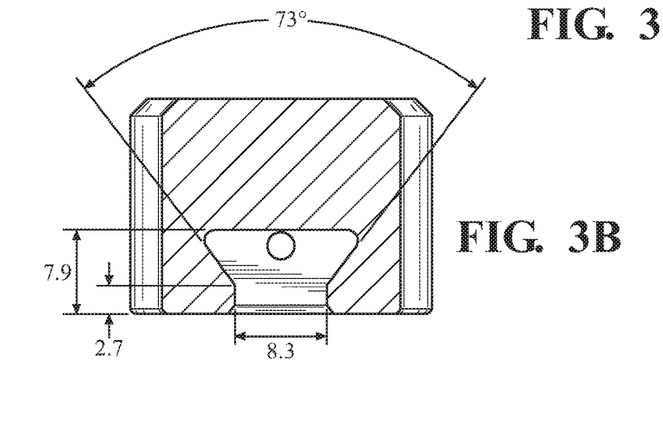
FIG. 3B is a top-down view of a bracket providing details of a vertically oriented groove structure.
Figure 3C:
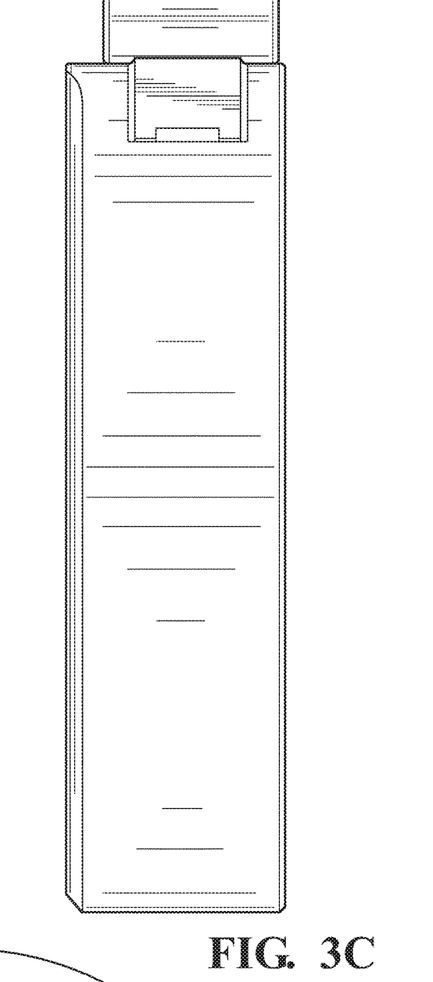
FIG. 3C is a side view of a bracket.
Figures 4A, 4B:
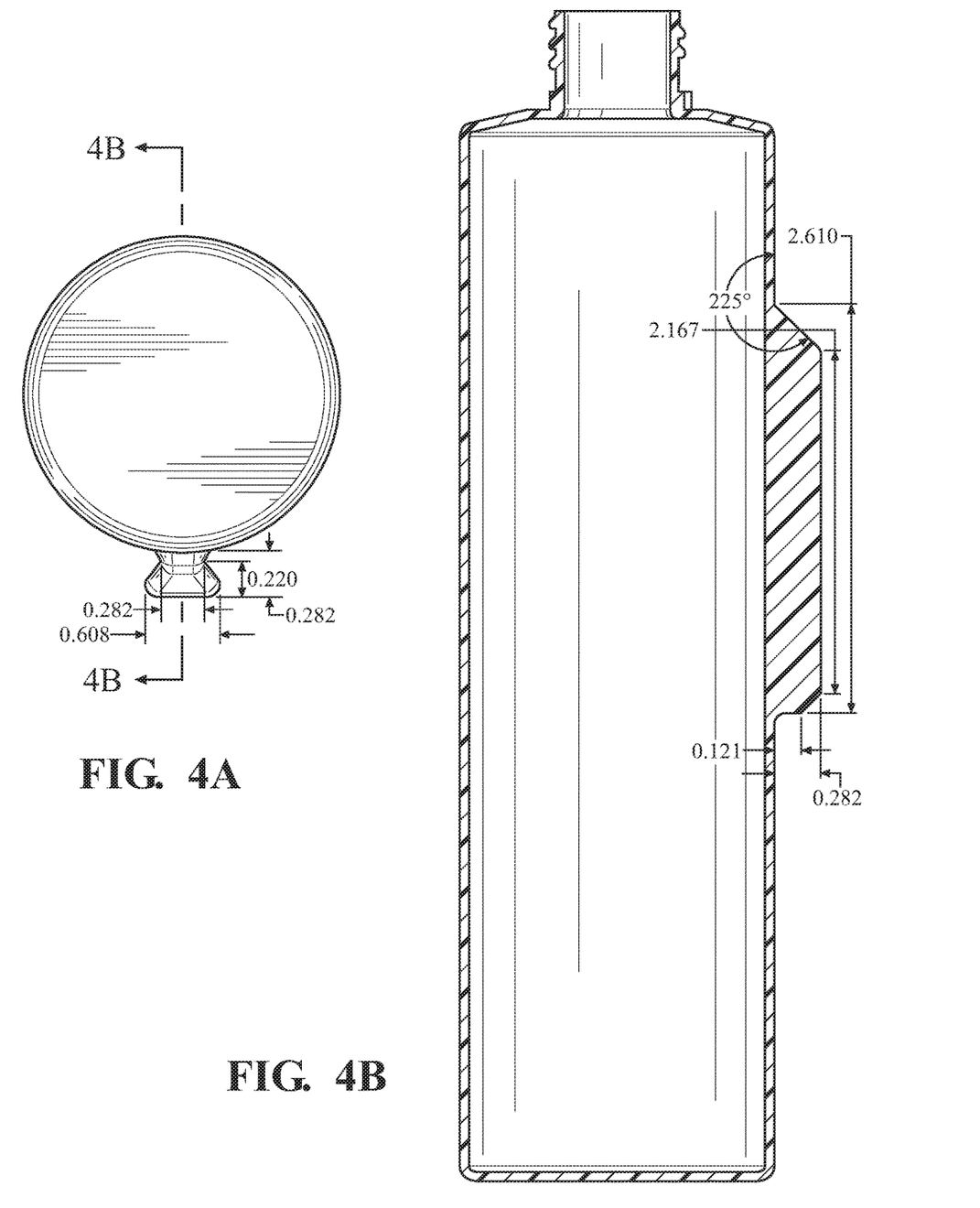
FIG. 4A is a bottom-up view of a container applicable to the invention including a vertically oriented rail structure configured to mate with a corresponding groove on a bracket, with one set of dimensions applicable to the rail structure.
FIG. 4B is a cross section of the structure depicted in FIG. 4A with another set of dimensions applicable to the rail structure.
Figure 5A:
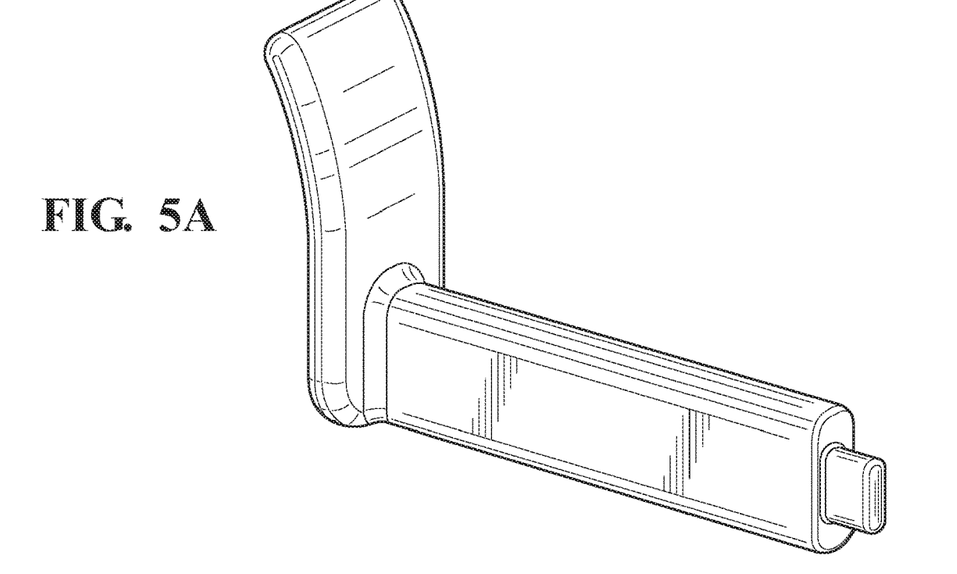
FIG. 5A is a tool having a distal tip configured for insertion into a side surface of a bracket to expose a recess, cavity, groove or slot configured to receive a protrusion on a container.
Figure 5B:
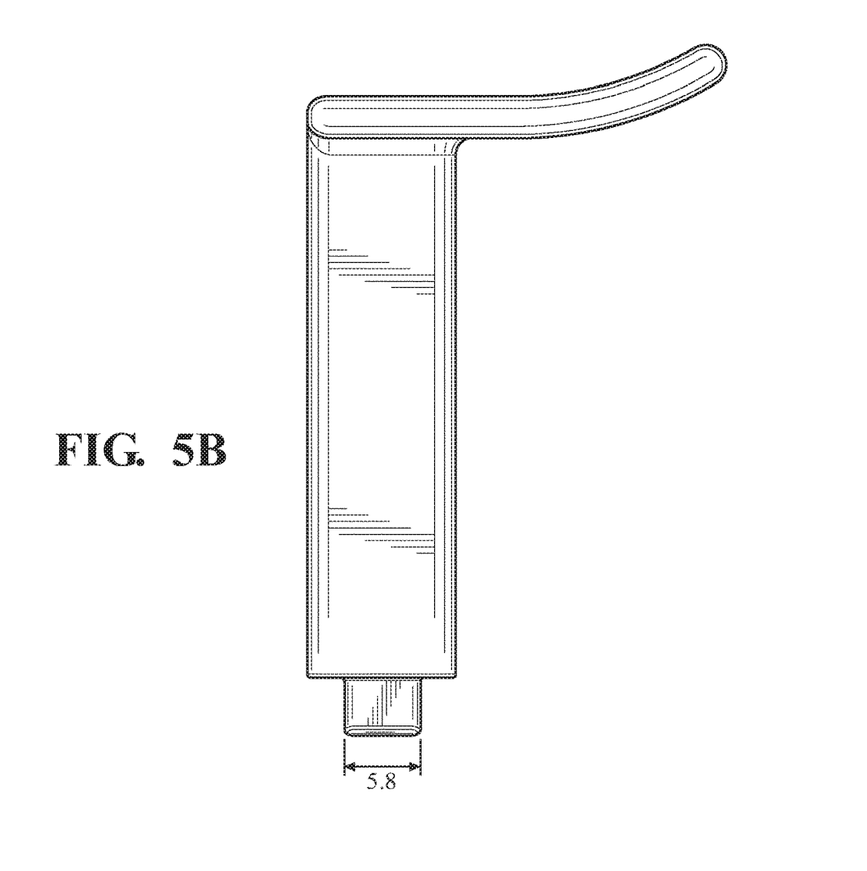
FIG. 5B is a different view of a tool of FIG. 5A showing one possible width dimension.
Figure 5C:
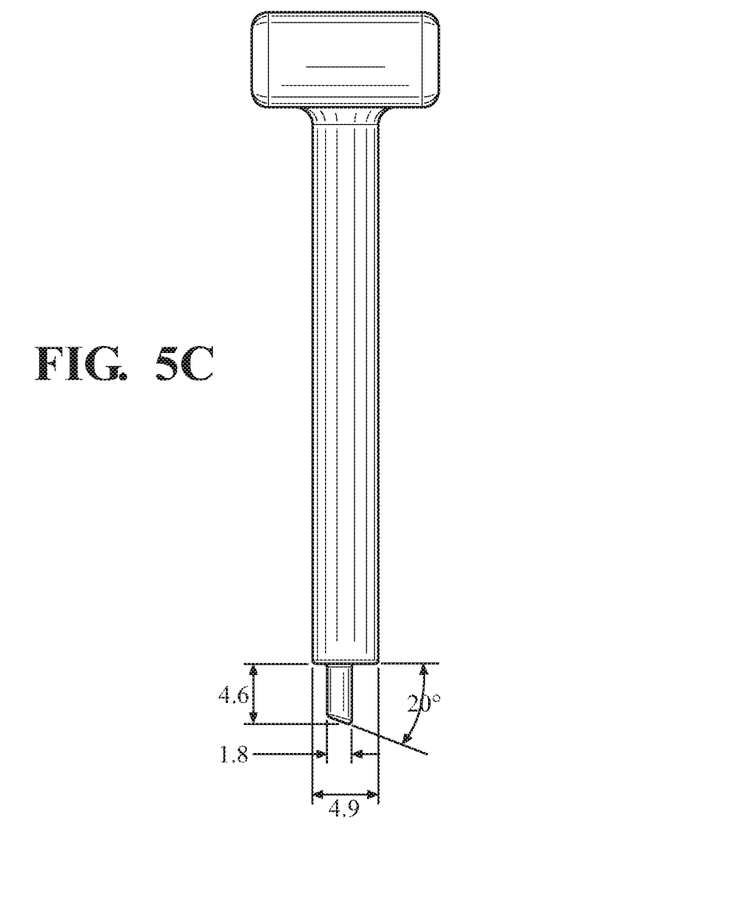
FIG. 5C is a further view of a tool of FIG. 5A showing other possible dimensions.
Figure 5D:
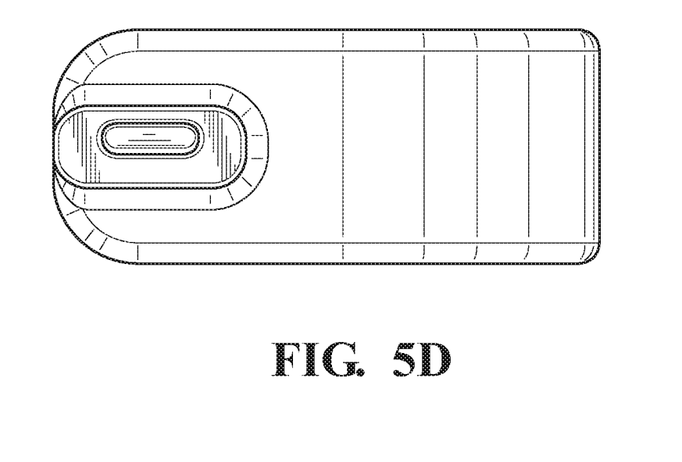
FIG. 5D is an end-on view of the tool of FIG. 5A illustrating the tip structure.

FIGS. 3A to 3B provide different views of a bracket with various dimensions, FIG. 4A, B shows different views of a container with various dimensions, and FIGS. 5A to 5D show a tool or key with various dimensions, with the understanding that while the dimensions shown (in inches) are preferred, the values are exemplary only and may vary depending upon design considerations, container type, weight requirements, and other factors. The bracket may be made from any suitable material, including metals such as aluminum and stainless steel, as well as hard plastics. In the preferred embodiment, the bracket body is constructed from die-cast aluminum with a brushed, satin or chrome finish.

In summary, the invention allows for multiple article mounting configurations while others in the market are limited to a single type of bottle or container. The design allows hotel owners, for example, to invest in the bracket while delivering flexibility to change out container configurations when retail brands are changed. In the preferred embodiments, the male component on the container has a design-engineered configuration that interfaces with a female counterpart on the bracket, allowing for ease of change-out of an empty container by unlocking the cap and sliding out the bottle.

As a further advantage, the bracket is small and inconspicuous. In the preferred embodiments, both the width and the height of the bracket are substantially less than the width and height of the container, resulting in a concealed bracket coupling solution. That is, the container, being wider and taller than the bracket, effectively "covers up" the bracket with respect to many or most viewing angles.

The invention claimed is:

1. A dispenser system, comprising:
a bracket having front and back surfaces, opposing side surfaces defining a width, and upper and lower portions defining a height;
wherein the back surface of the bracket is adapted for mounting against an existing wall surface;
wherein the bracket further includes a coupling structure configured to engage with a container to support the container in a position spaced apart from the wall surface;
the coupling structure including a vertically oriented slot on the bracket configured to receive a container with a protruding rail that engages with the vertically oriented slot; and
wherein the vertically oriented slot and protruding rail form a dovetail or T-shaped joint in cross section to prevent the container from being pulled away from the bracket when the rail is received in the slot.

2. The system of claim 1, wherein the vertically oriented slot is on the front surface of the bracket.

3. The system of claim 1, further including:
a locking mechanism between the bracket and the container; and
a tool configured to engage with the locking mechanism so as to release the container from the bracket for refilling or replacement.

4. The system of claim 3, wherein;
the locking mechanism includes a spring-biased latch; and
the tool includes a distal tip that is inserted into a portion of the locking mechanism to release the latch.

5. The system of claim 1, wherein the bracket further includes an upper panel that opens to provide access to the vertically oriented slot.

6. The system of claim 5, wherein:
the upper panel comprises a hinged door that is spring-biased into an open condition; and a latch that maintains the hinged door in a closed condition until opened.

7. The system of claim 6, further including a tool configured engage with the latch to open the door.

8. The system of claim 7, wherein the tool includes a distal end that is received by an opening in one of the side surfaces of the bracket to disengage the latch and unlock the door.

9. The system of claim 1, further including;
a container having front and back surfaces, opposing side surfaces defining a width, and upper and lower portions defining a height; and
a protrusion on the container configured to engage with a recess, cavity, groove or slot on the bracket.

10. The system of claim 9, wherein the vertically oriented rail extends from the back surface of the container.

11. The system of claim 9, wherein the width of the container is greater than the width of the bracket.

12. The system of claim 9, wherein the height of the container is greater than the height of the bracket.

13. The system of claim 12, wherein:
the height of the container is defined by upper and lower ends;
the height of the rail is defined by upper and lower ends; and
the upper end of the rail does not extend all the way up to the upper end of the container.

14. The system of claim 12, wherein:
the height of the container is defined by upper and lower ends;
the height of the rail is defined by upper and lower ends; and
the lower end of the rail does not extend all the way down to the lower end of the container.

15. The system of claim 9, wherein:
the container is a dispensing container adapted to be filled or refilled with a liquid, cream or gel; and
upper portion of the container includes a manually operated pump.

16. The system of claim 15, wherein the liquid, cream or gel is a soap, shampoo, conditioner or other personal hygiene product.

17. A dispenser system, comprising:
a bracket having front and back surfaces, opposing side surfaces defining a width, and upper and lower portions defining a height;
wherein the back surface of the bracket is adapted for mounting against an existing wall surface;
wherein the bracket further includes a coupling structure configured to engage with a container to support the container in a position spaced apart from the wall surface;
the coupling structure including a protrusion on one of the bracket or container, and a corresponding recess, cavity, groove or slot on the other of the bracket or container configured to receive the protrusion; and
wherein the protrusion and corresponding recess, cavity, groove or slot are dimensioned to form an interlocking coupling structure to prevent the container from being pulled away from the bracket when the protrusion is received in the recess, cavity, groove or slot a locking mechanism between the bracket and the container; and
a tool configured to engage with the locking mechanism so as to release the container from the bracket for refilling or replacement.

18. The system of claim 17, wherein the protrusion is a vertically oriented rail configured to engage with a vertically oriented slot.

19. The system of claim 18, wherein the vertically oriented rail and vertically oriented slot form a dovetail or T-shaped joint in cross section to prevent the container from being pulled away from the bracket when the rail is received in the slot.

20. The system of claim 18, wherein:
both the container and the vertically oriented rail have upper and lower ends; and
wherein upper end of the rail does not extend to the upper end of the container, or the lower end of the rail does not extend to the lower end of the container.

21. The system of claim 17, wherein:
both the container and the bracket define a width and a height; and
wherein the width, the height, or both the width and the height, of the bracket are less than corresponding width and height of the container so to visually obscure the bracket when the container is mounted on the bracket.

22. The system of claim 17, wherein:
the container is a dispensing container adapted to be filled or refilled with a liquid, cream or gel; and
upper portion of the container includes a manually operated pump.

23. A dispenser adapted to be supported by a wall-mounted bracket having a vertically oriented slot defined by an elongated gap that widens into an elongated cavity, the dispenser comprising:
a container having an outer surface, and upper and lower end portions defining a height;
a vertically oriented rail structure extending from the outer surface of the container to be received by the vertically oriented slot on the bracket; and
wherein the vertically oriented rail structure includes an elongated, vertically oriented member having a cross section corresponding to the elongated cavity, and a necked-down section between the surface of the container and the member having a width that corresponds to the width of the gap,
such that the vertically oriented rail structure and vertically oriented slot form an interlocking coupling structure that prevents the container from being pulled away from the bracket when the rail is received in the slot.

24. The dispenser of claim 23, wherein the interlocking coupling structure forms a dovetail or T-shaped joint in cross section.

25. The dispenser of claim 23, wherein the upper end portion of the container includes a manually operated pump.

26. The dispenser of claim 23, wherein the container is filled or refilled with a liquid, cream, gel, soap, shampoo, conditioner or other personal hygiene product.

* * * * *